United States Patent [19]

Engström

[11] Patent Number: 4,664,887
[45] Date of Patent: May 12, 1987

[54] APPARATUS FOR SEPARATING SOLID MATERIAL IN A CIRCULATING FLUIDIZED BED REACTOR

[75] Inventor: Folke Engström, Karhula, Finland

[73] Assignee: A. Ahlstrom Corporation, Noormarkku, Finland

[21] Appl. No.: 733,756

[22] Filed: May 14, 1985

[30] Foreign Application Priority Data

Jun. 1, 1984 [FI] Finland .................................. 842202

[51] Int. Cl.⁴ .............................................. B01J 8/24
[52] U.S. Cl. ...................................... 422/147; 55/345
[58] Field of Search .................. 422/147; 55/345; 209/144

[56] References Cited

U.S. PATENT DOCUMENTS

| | | | |
|---|---|---|---|
| 2,101,249 | 12/1937 | Frisch | 209/144 |
| 2,339,416 | 1/1944 | McDonald | 55/345 |
| 2,901,420 | 8/1959 | Evans | 422/147 |
| 2,973,094 | 2/1961 | Lundy | 209/144 |
| 4,313,910 | 2/1982 | Dries et al. | 422/147 |

FOREIGN PATENT DOCUMENTS 174341  1/1935  Switzerland .......................... 55/345

Primary Examiner—David L. Lacey
Attorney, Agent, or Firm—Bucknam and Archer

[57] ABSTRACT

An apparatus to be used in connection with a circulating fluidized bed reactor for separating solid material from flue gases and for recycling the solid material to the reactor. The apparatus comprises two adjacent, mainly horizontal, concentric vortex chambers of different sizes that have discharge openings concentric with the vortex chamber. The vortex chamber having a greater diameter is connected with the reactor via a gas inlet duct that is tangentially connected with the same vortex chamber. The vortex chamber having a smaller diameter is equipped with a gas inlet concentric with the smaller diameter vortex chamber, which inlet is connected with the gas discharge opening in the larger vortex chamber. Return ducts for the separated solid material are connected with openings on the periphery of the vortex chambers.

4 Claims, 2 Drawing Figures

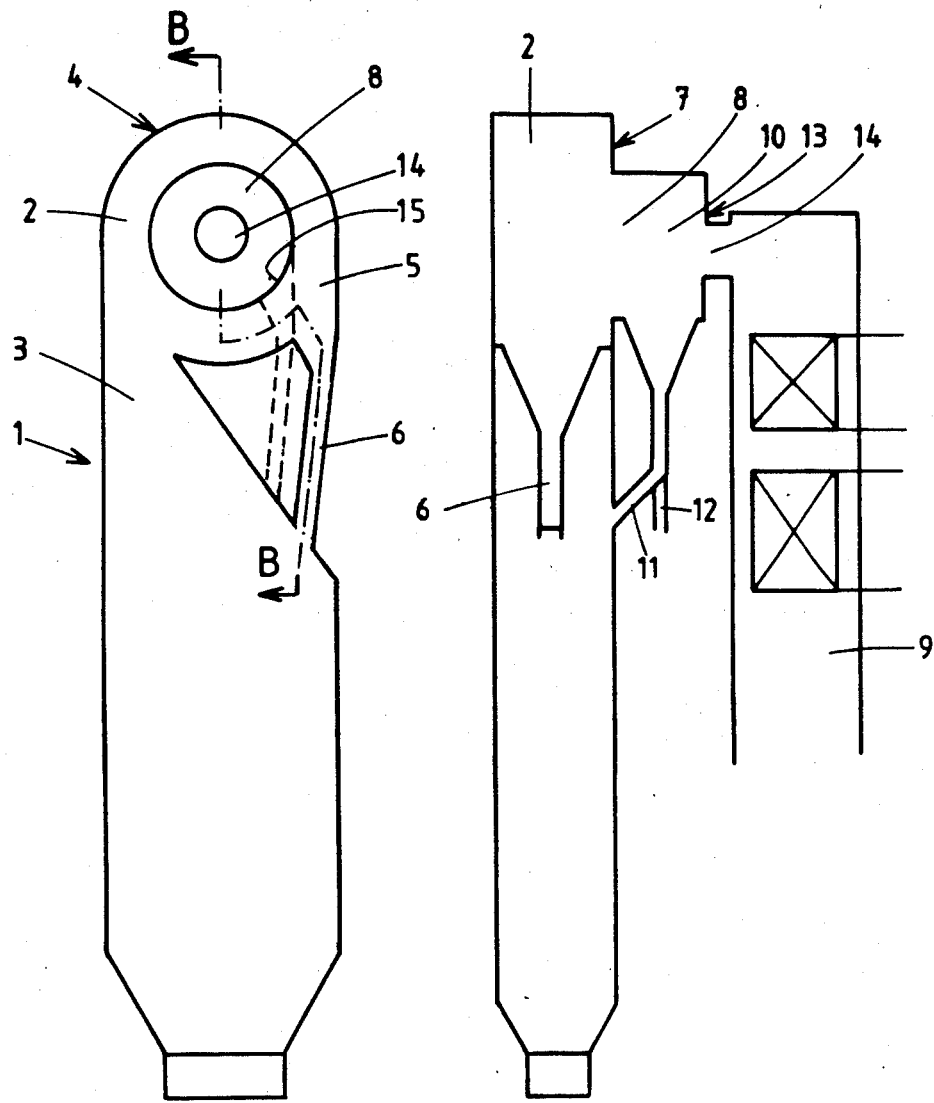

APPARATUS FOR SEPARATING SOLID MATERIAL IN A CIRCULATING FLUIDIZED BED REACTOR

TECHNICAL FIELD

The present invention relates to an apparatus, used in connection with a circulating fluidized bed reactor, for separating solid material from the flue gases of the reactor and for recycling the solids to the reactor.

OBJECT OF THE INVENTION

It is an object of the invention to provide an apparatus by which solids can efficiently be separated from the discharged flue gases of a circulating fluidized bed reactor and recycled to a desired point in the reactor.

DESCRIPTION OF THE PRIOR ART

Circulating fluidized bed technique has for a long time been applied e.g. in calcinators and recently to a larger extent in various reactors such as combustion furnaces and gasifiers. In the known applications the separation of solids is carried out in a conventional cyclone separator having a hopper-shaped bottom. The cylindrical vortex chamber of the cyclone is provided with a gas discharge pipe which guides the gases upwards and the solids are recycled to the reactor through a stand pipe via a gas trap. The gas trap is employed to prevent reactor gases from flowing into the cyclone through the stand pipe. A mechanical trap is most commonly used as a gas trap or in more advanced applications a fluidized bed of sand in a U-pipe. Especially in high temperature reactors the solids recycling system becomes complex and expensive. Part of the air required for fluidizing the gas trap flows upwards in the stand pipe which has a detrimental effect on the separation of solids, in particular on the separation of light and fine particles. Furthermore, a rising gas flow decreases the transport capacity of the stand pipe.

It is known that a substantial reduction in pressure and a high axial flow velocity are created in the centre of a conventional cyclone and this causes the cyclone to draw from the stand pipe. A suction flow generated in this way has usually no tangential velocity, thus almost all the solid material the flow carries with it is transported out through the centre pipe of the cyclone. A recycling system provided with a conventional cyclone is therefore very sensitive to the suction flow from the stand pipe and requires a reliable gas trap.

In steam boiler applications the use of a conventional cyclone results in disadvantageous constructions because the conventional cyclone divides the boiler into a separate combustion chamber and a convection part after the cyclone between which the equipment for recycling the solid must be installed.

Mechanical gas traps are rapidly worn in particular in hot condition and disturbances in their use are frequent.

Also applications having a conventional cyclone installed inside the reactor are known in which the entire solids recycling system is built inside the reactor. This application has, however, severe disadvantages, i.e. corrosion and erosion of the cyclone, as cooling of the supporting structure can not be arranged in a simple way. Furthermore, the system is, as also conventional cyclones, encumbered by the sensitivity to the suction flow from the stand pipe.

SUMMARY OF THE INVENTION

The object of the invention is to provide an apparatus with which the drawbacks of the devices discussed above can be avoided and good separation achieved. For this purpose two-staged or multistaged separation is employed; coarse and wearing particles are separated at low peripheral speeds in the first stage and smaller particles at high peripheral speeds in the following stages.

The apparatus according to the invention is characterized by at least two adjacent, mainly horizontal, concentric vortex chambers of different sizes having concentric discharge openings. The vortex chamber having a smaller diameter is equipped with a gas inlet concentric with it, which inlet is connected with the gas discharge opening in the vortex chamber having a greater diameter.

BRIEF DESCRIPTION OF THE DRAWINGS

The invention is described below more specifically with reference to the accompanying drawings in which FIG. 1 is a vertical section of an embodiment of the invention;

FIG. 2 is section of FIG. 1 along line B—B.

SPECIFIC DESCRIPTION

In the figures numeral 1 refers to a vertical circulating fluidized bed reactor from the upper portion of which the discharged flue gases are guided into the first vortex chamber 2 of the two horizontal vortex chambers of a separator 4 through a gas inlet duct 3 connected tangentially to the first vortex chamber. The solid material separated at the periphery of the first vortex chamber is discharged through an opening 5 and is recycled to the reactor via a return duct 6 connected tangentially to the vortex chamber. The second vortex chamber 10 has a smaller diameter and is connected to a gas discharge opening 8 at the end 7 of the first vortex chamber. The solid material separated at the periphery of the second vortex chamber is discharged from the chamber through an opening on the periphery and is recycled to the reactor through a return duct 11 or is discharged from the system through a discharge duct 12.

The purified gases flow through an opening 14 in an end 13 of the vortex chamber 10 to a convection part 9.

As to its flow technolgy, a system according to the invention differs from a conventional systems e.g. in that solid material is recycled to the reactor carried by the gas flow (1 to 10% of the gases). As the solids are discharged at the periphery of the vortex chamber where the velocity of the solids is at its highest, good separation is achieved.

The construction according to the invention provides obvious structural advantages, e.g.
- compact structure
- expansion joints are voided
- the reactor can be pressurized without substantial extra costs.

Solids can be discharged from the vortex chambers via an opening extending over the entire length of the vortex chamber and a return duct connected to the opening, or via several adjacent openings and return ducts.

The return ducts may be provided with water cooled shells if the material to be recycled to the reactor is to be cooled.

The return ducts may be provided with valves whereby some of the ducts may be closed. The connection points of the return ducts to the reactor may be positioned at different heights, thus the solids can be guided to a desired point.

The invention is not limited to the embodiment presented as an example, only, but several applications and modifications may be made of it within the scope of protection defined by the patent claims.

We claim:

1. In a fluidized bed reactor wherein the solid material being reacted is introduced at the bottom of the reactor, flue gases are generated, said flue gases carry solid material and the solid material is separated from the flue gases in a separator and is recirculated to the reactor through return ducts, the improvement which comprises said separator comprising at least two adjacent, concentric vortex chambers of different diameter, said at least two vortex chambers having concentric gas discharge openings, the vortex chamber having a smaller diameter having a gas inlet concentric with said smaller diameter vortex chamber, said inlet being connected with the gas discharge opening of the vortex chamber having a greater diameter; the reactor has a gas outlet, a gas inlet duct connected tangentially with the vortex chamber having greater diameter and with said gas outlet of the reactor; said discharge openings being at the periphery of each of the vortex chambers, each of said discharge openings being in communication with said return ducts connected with the reactor for recirculating the separated solid material.

2. The fluidized bed reactor according to claim 1 wherein said vortex chambers are essentially horizontally arranged.

3. The fluidized bed reactor according to claim 1 wherein said return duct connected to the discharge opening of the vortex chamber of greater diameter is connected tangentially to said vortex chamber.

4. The fluidized bed reactor according to claim 1 wherein the gas discharge opening of the vortex chamber of smaller diameter is positioned at the end of the vortex chamber of smaller diameter opposite said gas inlet.

* * * * *